US007024649B2

(12) United States Patent
Collmeyer et al.

(10) Patent No.: US 7,024,649 B2
(45) Date of Patent: Apr. 4, 2006

(54) MULTI-OUTPUT POWER SUPPLY DESIGN SYSTEM

(75) Inventors: Arthur Collmeyer, Incline Village, NV (US); Thomas Szepesi, Saratoga, CA (US); Dickson Wong, Burlingame, CA (US); Allen Samuels, San Jose, CA (US)

(73) Assignee: IWATT, Los Gatos, CA (US)

( * ) Notice: Subject to any disclaimer, the term of this patent is extended or adjusted under 35 U.S.C. 154(b) by 260 days.

(21) Appl. No.: 10/367,562

(22) Filed: Feb. 14, 2003

(65) Prior Publication Data
US 2004/0172603 A1    Sep. 2, 2004

(51) Int. Cl.
G06F 17/50    (2006.01)
G06F 9/45     (2006.01)
G06F 9/455    (2006.01)

(52) U.S. Cl. .................................. 716/11; 716/1; 716/9
(58) Field of Classification Search .............. 716/1–18
See application file for complete search history.

(56) References Cited

U.S. PATENT DOCUMENTS 6,643,835 B1 * 11/2003 Matsumoto et al. .......... 716/11

OTHER PUBLICATIONS

Bowes et al., "CAD of PWM Controlled Power Electronic Systems Using General Purpose Circuit Analysis Packages," 1989 IEEE, pp. 1073-1080.*
DeJesus et al., "PEARL: An Expert System for Power Supply Layout," 23rd DAC, 1986 IEEE, pp. 615-621.*
Froehleke et al., "CAE-Tool for Optimizing Development of Switched Mode Power Supplies," 2001 IEEE, pp. 752-758.*
Gezgin et al., "Simultaneous Design of Power Stage and Controller for Switching Power Supplies," IEEE Trans. on Power Electronics, vol. 12, No. 3, May 1997, pp. 558-566.*
Igarashi et al., "A Low-power Design Method Using Multiple Supply Voltages," 1997 ACM, pp. 36-41.*
Kelkar et al., "Computer-Aided Electrical Design of Power Processing Systems," 1988 IEEE, pp. 72-81.*

(Continued)

Primary Examiner—Leigh M. Garbowski
(74) Attorney, Agent, or Firm—Fenwick & West LLP

(57) ABSTRACT

A tool is described to aid in the design and verification of multi-input, multi-output power supply systems. The designer describes the system requirements and constraints to the tool, which allows an iterative exploration of various alternative designs that satisfy the requirements and constraints. Alternative designs may comprise different power supply topologies, multiple controllers or multi-controllers, or configurable controllers that implement the power supply system. The tool generates a design for a power supply system that is reconfigurable to allow for performance optimization. The power supply system is configurable automatically according to a digital control signal. The digital control signal comprises configuration data which establishes the structure of the power supply system, and which determines the output power conditions of the power source. The different conditions generated by configuration data comprise output voltage, sequencing information, current, topology, and other operational conditions such as overload protection.

41 Claims, 9 Drawing Sheets

Figure 3. Multi-input, Multi-output power supply incorporating a multi-controller

OTHER PUBLICATIONS

Lidsky et al., "Early Power Exploration—A WWW Application," 33rd DAC, 1996 ACM, 6 pages.*

Tam et al., "A CAD Environment for Switch-Mode Power Supplies," PCC-Yokohama '93, IEEE, pp. 496-501.*

Wu et al., "Development of an Integrated CAD Tool for Switching Power Supply Design with EMC Performance Evaluation," IEEE Trans. on Industry Applications, vol. 34, No. 2, Mar./Apr. 1998, pp. 364-373.*

International Search Report and Written Opinion; PCT/US04/04124, Jul. 26, 2005.

Kelkar et al., "Computer-Aided Electrical Design of Power Processing Systems," 1998 IEEE, pp. 72-81.

Tam et al., A CAD Environment for Switch-Mode Power Supplies, 1993 IEEE, pp. 496-501.

Wu et al., "Development of an Integrated CAD Tool for Switching Power Supply Design with EMC Performance Evaluation," 1998 IEEE, pp. 364-373, vol. 34, No. 2.

* cited by examiner

Figure 1. Block diagram of a multi-input, multi-output power supply
(PRIOR ART)

Figure 2. Block diagram of a distributed multi-output power
(PRIOR ART)

Figure 3. Multi-input, Multi-output power supply incorporating a multi-controller

MULTI-OUTPUT POWER SUPPLY DESIGN SYSTEM

FIELD OF INVENTION

This patent relates to the tools and techniques used to design power supplies and power supply controllers.

BACKGROUND

The power requirements of electrical systems are becoming ever more demanding. To maximize energy efficiency, power density, and system serviceability, the power system designer is being asked to provide increased functionality and improved performance at minimal cost. As a result, power supplies and their controllers are becoming increasingly complex.

One of the trends challenging designers is the requirement for more regulated output voltages within the same system. A typical battery powered personal digital assistant (PDA) may reasonably be expected to provide four or more different voltages, each with dramatically different dynamic requirements. One supply may service the CPU, another, the display, another the touch screen and another an RF transceiver. In the case of a multi-output power supply, i.e., a power supply providing multiple regulated output voltages, the designer is challenged not only by the problems posed by the control of multiple power stages, but also by the problems of interactions among controllers. Existing tools and techniques for designing single-output power supplies do not address these challenges.

Another trend is the requirement for systems to operate with multiple input power sources. For example, a device may at times be powered by batteries with one range of input voltages and at other times be line powered with a different range of input voltages. In the case of large systems, the use of uninterruptible backup power supplies is increasingly common. In the case of a multi-input power supply, i.e., a power supply incorporating two or more alternate input power sources, the designer is challenged not only by the requirement for "graceful" switching between or among input power sources, but also by the widening range of input voltages to the power stages.

Still another trend is the widespread adoption of "distributed" power systems that allow, for example, the modular expansion of large electronic systems through "hot swapping" of subsystems. These systems generally involve a hierarchy of different power supplies, with one or more power supplies providing power to others. In the case of distributed power systems, the system designer is challenged to implement a modular, yet cost-effective power system architecture. To help designers implement this architecture, a new category of programmable devices, known as power management devices, has evolved. These devices, capable of managing the operation of multiple power supplies, have found use in battery-powered systems as well.

In the case of battery-powered systems, the continued pressure on the system designer to reduce parts count, space, weight and cost is driving an industry trend toward combining multiple controllers within a single integrated circuit. Such a device is referred to as a multi-output controller or multi-controller. But there are many barriers to achieving this level of integration.

One major barrier to integration is the large number of power supply topologies, including: buck, boost, buck-boost, fly-back, fly-forward, isolated, non-isolated, DC to DC, DC to AC, and AC to AC, etc. In addition to the large number of topologies, the control strategies employed to control these topologies are likewise numerous, supporting a variety of operating modes including continuous conduction, discontinuous conduction, critically discontinuous conduction, and others. Historically, the economics of the controller marketplace has mitigated in favor of topology-specific (and even control-strategy-specific) controllers, implemented with analog circuitry. Carrying this analog theme forward, a few commercial multi-controllers, realized essentially by integrating an application-specific ensemble of topology-specific controllers, have been introduced to the marketplace. Broad acceptance of such devices will happen slowly as different topology (and control strategy) combinations and permutations are introduced. This proliferation of devices, however, becomes a barrier of its own, as the rapidly growing number of different device types will create substantial manufacturing disadvantages for both customers and vendors.

Furthermore, the barriers to integration are not limited to those implicit in combining and permuting controllers. In fact, in very high volume applications, it is often desirable to integrate the power supply controller with other elements of the system into an application specific integrated circuit (ASIC). A barrier to this is that controllers have historically been designed using analog circuit techniques, which are generally difficult to integrate into system-level ASIC design methodologies that are primarily digital in nature. And this problem is further compounded by a general lack of available personnel that combine power systems and mixed-signal silicon design expertise.

A promising trend in power supply controller design is the replacement of analog control loops with conventional digital logic. The application of digital logic further provides the foundation for a flexible controller, that is a controller that can be synthesized from a flexible controller template to control any topology using any applicable control strategy, substantially overcoming the controller integration-proliferation barriers.

With modern semiconductor geometries, the impact of a small number of unused gates in a multi-topology controller is negligible as other factors dominate the cost, e.g., packaging, etc. Further, by allocating a portion of the memory incorporated in the flexible controller template for the purpose of enabling user-programmability, user-configurable multi-controllers, capable of controlling different topologies in different combinations are realizable. The flexible controller then becomes the building block enabling the realization of integrated multi-controllers, including user-configurable multi-controllers, capable of serving a broad spectrum of applications. With digital logic, the circuitry of the controller is more easily realized using the design techniques of modern ASICs, overcoming the ASIC integration barrier as well. Only a limited number of analog cell types (such as a voltage comparator, reference voltage generator, amplifiers, A/D and D/A converters, etc.) are required to implement the controller. Design of these cells is relatively easy and requires no special knowledge of power systems or special manufacturing processes. Indeed, many ASIC design systems already have the requisite cells in their libraries.

The lack of personnel with the required power systems and mixed-signal design experience remains as a barrier. Consequently, there is a need to have computer-aided tools for the design of multi-input, multi-output power supplies and especially for the design of multi-controllers, for systems large (distributed) and small (battery-powered). These tools should address the requirements for multi-controllers, whether the requirements be for a hierarchy of inter-communicating controllers or multi-controllers, or for a standalone multi-controller, or for a multi-controller integrated with other system elements using standard logic processes.

SUMMARY OF INVENTION

A tool is described to aid in the design of multi-input, multi-output power supplies. The designer describes the system requirements and constraints to the tool, which allows the exploration of various alternative designs that satisfy the requirements and constraints. After a particular alternative is selected, the tool creates the schematic of the desired power supply and generates the data necessary to manufacture, configure, or operate the control subsystem including the control component or components of the supply.

The tool generates control subsystem designs for any of three target implementations, where each target implementation implies a different realization strategy for the control subsystem. In a first target implementation, a portion of the control subsystem is provided in a net list form suitable for the realization of an application specific integrated circuit (ASIC). Instructions for the manufacture of such application specific controller components may be generated.

In a second target implementation, a portion of the control subsystem is provided as information to configure an off-the-shelf, user-configurable controller. The tool searches a library of off-the-shelf controller information to select the optimal controller or combination of controllers. Configuration information is generated that configures the selected controller or controllers to operate in conformance with the designer's specifications.

In a third target implementation, a portion of the control subsystem is provided in a net list form suitable for the customization of one or more programmable logic devices in a rapid prototyping system constructed for prototyping multi-input, multi-output power supplies.

For any target implementation, software suitable for execution on a host system CPU is generated that allows the control and monitoring of the generated design. A feature of the generated software is that it has virtually the same interface regardless of the target implementation, enabling early development of upper layers of system software using physical embodiments different from that of the final system. When the final physical embodiment becomes available, the upper software layers require little or no modification.

In a preferred embodiment, the tool generates a design for a power supply system that is configurable and controllable by a digital control signal. The digital control signal comprises configuration data and power management data. Configuration data determines the structure and behavior of the power supply system as well as its output power conditions. The different conditions generated by configuration data comprise output voltage, sequencing information, current capability, dropout voltage and topology, and other configuration-related attributes. Power management data comprise data generated in the course of monitoring the operation of the power supply system and adapting to changes in the operating environment. Examples include data associated with the switchover of one input power source to another, with events generated by a cooperative load, and with sleep mode management.

DESCRIPTION OF THE PREFERRED EMBODIMENT

In the following descriptions, numerous specific details are set forth, such as the specific rendering of the implementation, in order to provide a thorough understanding of the present invention. It will be apparent, however, to one skilled in the art that the present invention may be practiced without these specific details. In other instances, well-known circuits, control logic, and design and coding techniques have not been shown in detail, in order to avoid unnecessarily obscuring the present invention.

Multi-Output Power Supply Design

Figure 1:
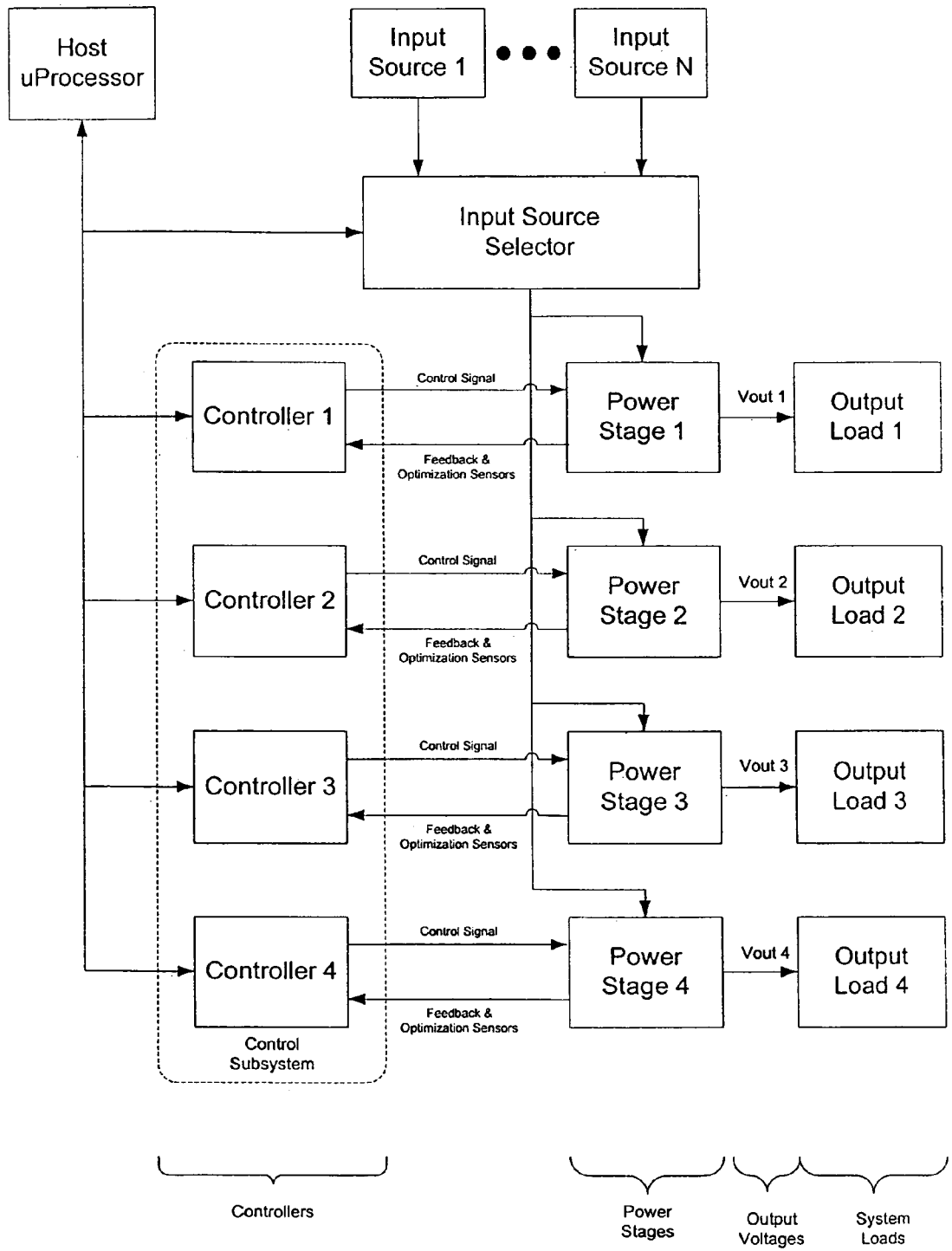
FIG. 1 is a block diagram illustrating a multi-output power system representative of the multi-output power supply category.
Figure 2:
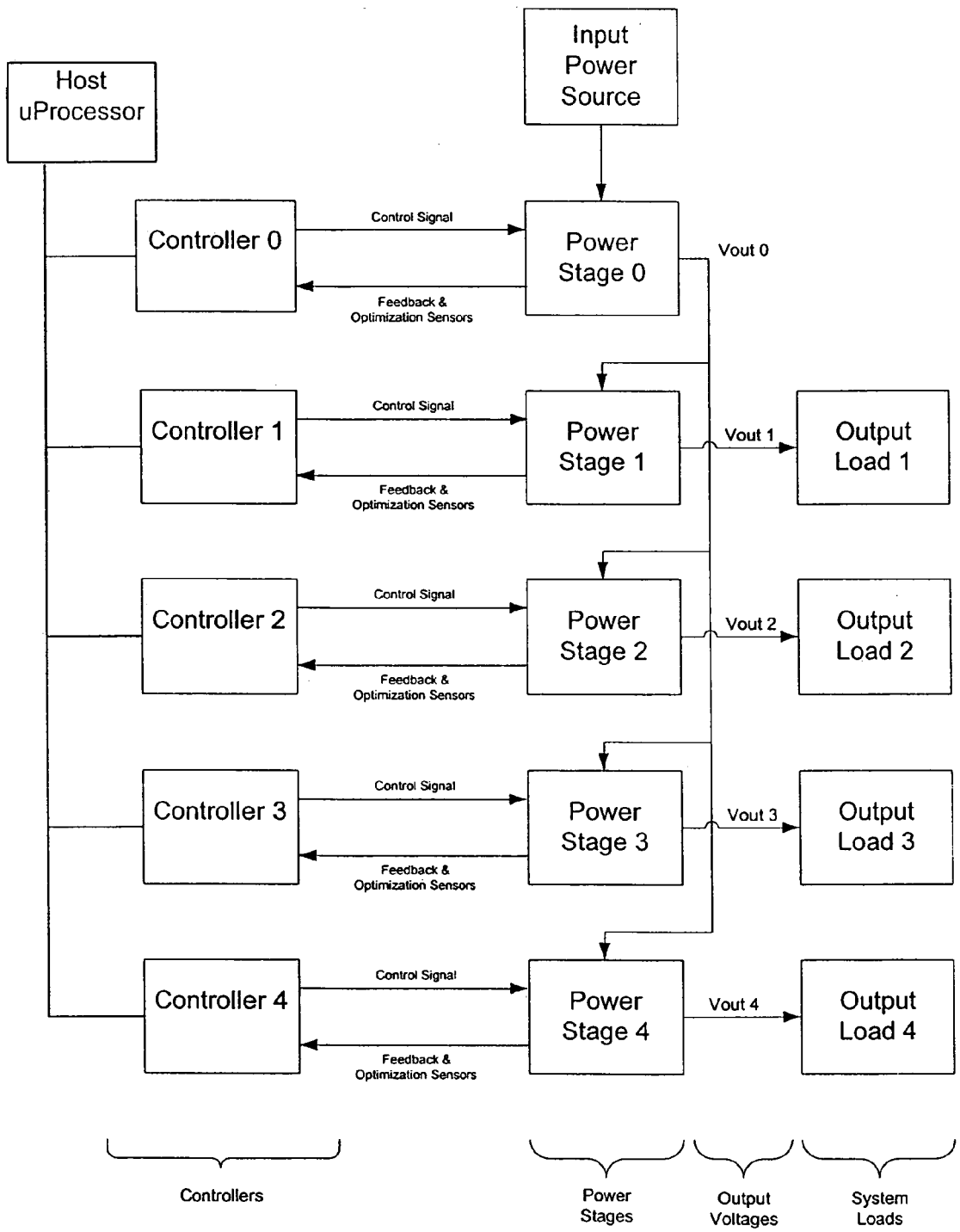
FIG. 2 is a block diagram illustrating a multi-output power system representative of the distributed multi-output power supply category.

Multi-output power supply designs can be classified under two headings. The first classification, referred to simply as multi-output power supplies, includes power supplies comprising multiple power stages, where each power stage provides power to a load which is not a power supply. The second classification, referred to as distributed multi-output power supplies, includes power supplies comprising multiple power stages, where at least one power stage provides power to one or more of the other stages. Power supply designs known to be representative of these classifications are illustrated in block diagram form in FIGS. 1 and 2.

The task of designing a multi-output power supply includes the tasks of 1) determining which of the two classifications is more appropriate and, if distributed, how to distribute, 2) designing the power stages, and 3) designing the control subsystem. Some design decisions, such as whether to distribute and how, may be decided a priori. In these cases, a design tool is able to accept these decisions and complete the remaining design tasks, provided a design is possible.

The task of designing the control subsystem is the most challenging, as the impact of ever more exacting requirements as well as the flow of new technology applicable to satisfying these requirements converges in the control subsystem. This task includes the tasks of designing (or configuring) the controllers, including multi-output controllers, as well as the tasks of defining their interconnections with the power stages, with each other, and with external subsystems, including "cooperative" loads (see below). The control subsystem of FIG. 3 provides for communication with a host microprocessor as well as Load 4 (L4), which could be, for example, a cooperative high-performance microprocessor.

Figure 3:
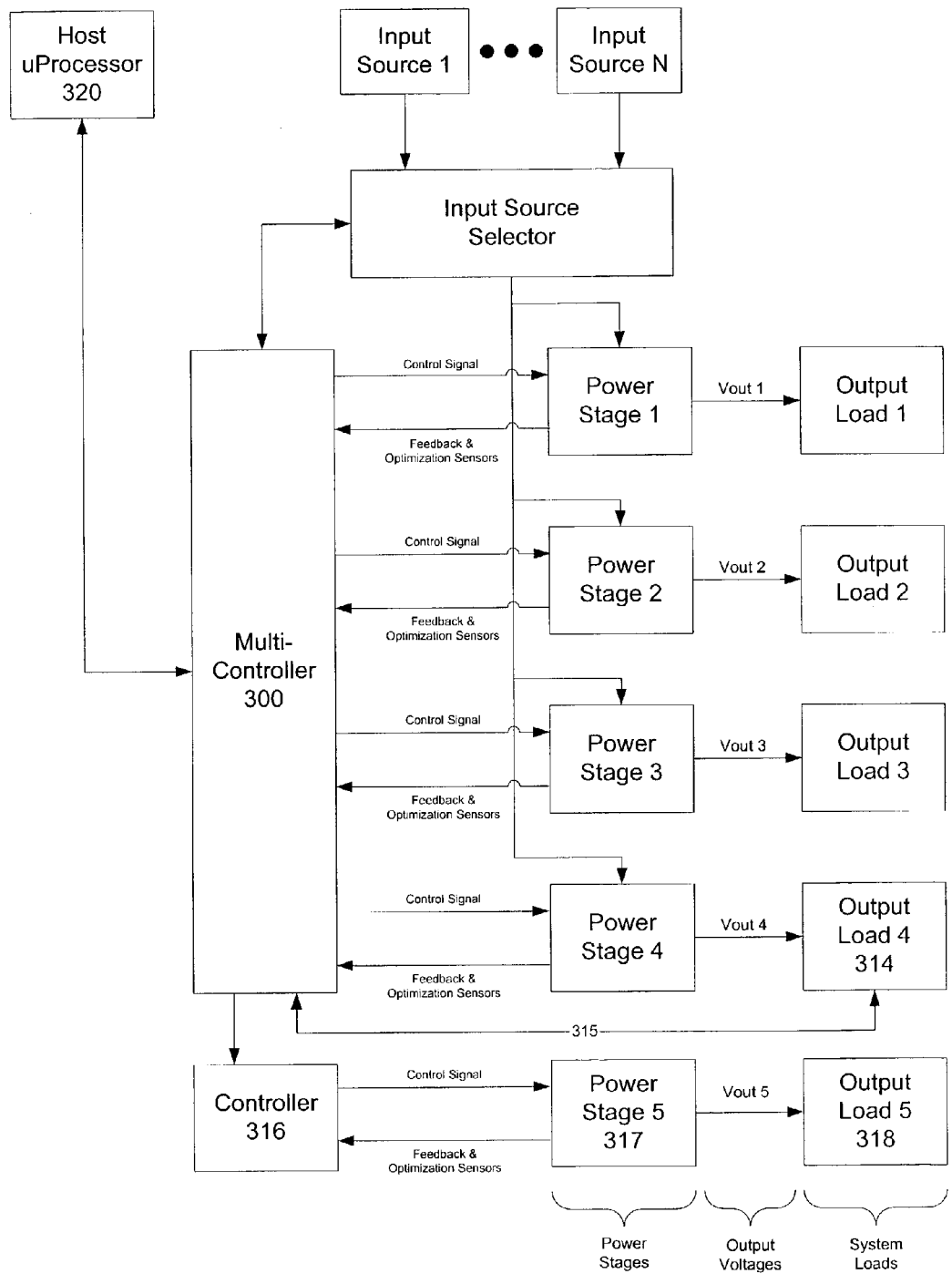
FIG. 3 is a block diagram illustrating a multi-output power supply control subsystem incorporating a multi-output controller or multi-controller.

The requirement to minimize the cost as well as the power consumption of control subsystems biases some designs toward multi-controller realizations (see FIG. 3). The requirement to minimize the time and cost to get power supplies to market biases some designs toward configurable controller/multi-controller realizations.

Configurable controllers/multi-controllers are controllers that provide the designer the option of applying the (configurable) controller across a range of specifications. Historically, configurable power supply controllers have been limited to a class of devices configured by hard-wiring a specific bias voltage (or set of voltages) onto one (or more) of the controller terminals. The present invention creates a new class of configurable power supply controllers, configurable automatically according to digitally encoded settings and switches that can change the structure of the power supply system, henceforth referred to as configuration information. Off-the-shelf, these controllers dramatically reduce the time and cost to bring power supplies to market. Hence this design tool exploits, when appropriate, the potential of off-the-shelf user-configurable controllers and multi-controllers. If a suitable off-the-shelf user-configurable controller or multi-controller is not available, the present invention provides a tool for designing a configurable control subsystem that is configurable automatically using a digital control signal.

Design Tool

The design system (tool) is a comprehensive system for aid in the design of multi-input, multi-output power supplies. The design tool aids in design and verification of an on-chip power supply system, which comprises a power supply topology, controller, multi-controller, or configurable controller that implements the power supply system; as well as other on-chip elements. The design tool also aids in physical design and verification of on- and off-chip power supply system.

Figure 4:
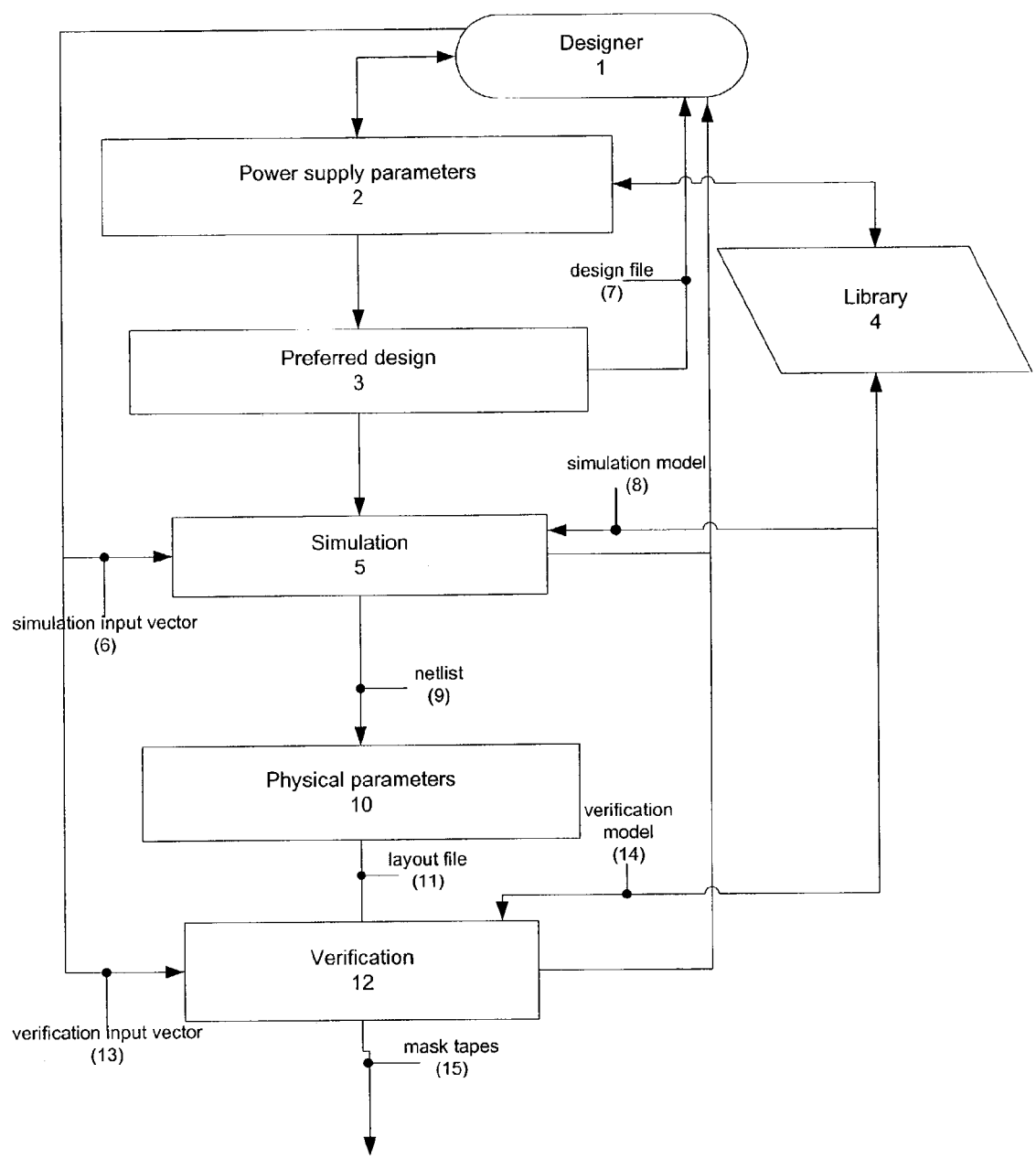
FIG. 4 is a general block diagram illustrating a schematic of the interaction between the designer and the communicating programs.

The tool comprises a program or a plurality of communicating programs that interact with the designer. FIG. 4 is a general block diagram illustrating a schematic of the interaction between the designer 1 and the communicating programs. The designer 1 supplies the design tool with power supply parameters 2, which describe the power supply system requirements and constraints. Power supply parameters include specifications to be met by the power supply, preselected topologies, control strategies and components, design evaluation criteria, and other information. Parameters accepted from the designer are generally divided into two categories: required and optional. Required parameters are provided by the designer before the tool creates a first design. Required parameters describing the desired power supply include: number of input voltages, input voltage characteristics, the number of output voltages, and the requirements of each output voltage.

Optional parameters need not be supplied by the designer as the design tool has default settings. For example, optional parameters include: type of off-the-shelf controller, functionality of flexible controller, or functionality of programmable processor. If the designer does not supply optional parameters, for example, the design tool has default settings such as a specific off-the-shelf controller, no flexible controller, or no programmable processor. In additional to their natural values, optional parameters have a setting known as "don't care" or "default" which indicates that the designer has requested the tool to select a value (or setting). Naturally, the designer can interrogate the tool to determine which values the tool selected for optional parameters. It is permissible for the designer to change an optional parameter from a specific setting back to the "don't care" setting, restoring the tool's capability of automatically selecting an appropriate setting.

Once the required parameters have been input, the tool attempts to generate a preferred power supply design 3. The design tool can use, for example, Design Compiler by Synopsys Corporation, or any other available circuit design aids, in order to generate the preferred design. The design tool communicates with library 4 to select circuit elements consistent with the parameters 2. This effort fails if the parameters input by the designer are inconsistent or physically impossible. The design tool notes if the parameters input by the designer are inconsistent or impossible and reports the failure to the designer along with detailed information informing the designer of the reason for the failure. The designer may modify the parameters, thus allowing the tool to generate a new design. The tool waits for the designer to input the modified parameters.

If the parameters input by the designer are not inconsistent, the design tool proceeds to select a power supply design. The parameters known as design evaluation criteria enable the tool to compare designs quantitatively in order to select a design. For example, design evaluation criteria may specify a design that minimizes the maximum of weighted unfavorable variances to selected parameters such as output ripple, step response time, maximum operating temperature, cost, availability, and others. Design evaluation criteria are optional parameters and need not be supplied by the designer, as the design system has default criteria. For example, default criteria may be to minimize cost. The design tool communicates with the library 4 to select an optimal design based on default or designer supplied design evaluation criteria.

The preferred design is in the form of a digital/analog design file 7, from which the user can extract comprehensive design information, including system level schematics, performance specifications, bills of material, and control subsystem on-chip design output. The designer views the design information and may alter the power supply parameters 2, thus causing the tool to select a new design. Thus the design tool allows the designer to explore the range of possible alternative implementations through an iterative design process.

The tool can also run a simulation 5 on preferred design 3. The designer supplies simulation input vector 6, and the tool predicts or computes operational characteristics using an appropriate simulation model 8, retrieved from the library 4. By communicating with the library 4, the simulation generates the necessary data to enable a circuit simulation of the preferred design under various conditions. For instance, characteristics such as hold-up time, step response, or ripple may be simulated. The designer can modify the simulation input vector 6 to test different characteristics of the design. The tool can automatically run the simulations, extracting the results and reporting them directly to the designer, or the designer may choose to have the tool generate scripts containing the simulation commands and data but to execute the simulation at a later time. Also, the designer may modify the simulation command and output data in order to create files to simulate a condition or sequence not directly supported by the tool. The simulation option allows the designer to determine the operational characteristics.

Upon viewing simulation output, the designer may desire to alter the power supply parameters 2 and generate a new power supply design. The on-chip design and verification of the power supply system offered by the tool is thus an iterative process, allowing the designer to explore a range of possible implementations and to observe their costs and effects.

Once power supply and controller designs have been generated, the designer has several options. Beside the option to generate the necessary output information to simulate the design to test various operational characteristics, the designer has the option to output design information for any one or more of three target implementations of the control subsystem (see below), including a rapid prototyping system. Another option is to generate a variety of specific information about the generated design. For example, a bill of materials with estimated pricing could be generated. Yet another option is the information necessary to produce any custom components such as transformers and inductors.

Alternatively, the tool may also aid in the physical design and verification of the on- and off-chip power supply system. Once the on-chip design process is complete, the tool outputs a netlist 9 for use in the physical design and verification of the on- and off-chip power supply system. To design the physical layout of the power supply system, the designer supplies the tool with physical parameters 10 such as pin count limit or functionality. The tool then uses a commercially available physical design tool to provide information and guidelines on how to connect the on- and off-chip portions of the power supply system electrically and physically. The information provided includes: each circuit element, the interconnection between the circuit elements as well as between the circuit elements and the on-chip portion, or other physical design suggestions such as thermal and noise reduction guidelines and routing information to aid in printed circuit board (PCB) layout and manufacturing.

The physical design is output in the form of a layout file 11, and the tool may run a verification 12 on the physical design much like the simulation 5 of the on-chip power supply design. It is contemplated that the layout file 11 may be in the form of a netlist. The designer supplies verification input vector 13, and the tool predicts or computes operational characteristics using an appropriate verification model 14, retrieved from the library 4. By communicating with the library 4, the verification generates the necessary data to enable a circuit simulation of the physical design under various conditions. The designer may modify the verification input vector 13 to test different characteristics of the physical design.

Upon viewing simulation output, the designer may alter the power supply parameters 2 and generate a new power supply design. Thus, the physical design and verification of the power supply system offered by the tool is also an iterative process, allowing the designer to explore a range of possible implementations, for instance to observe their costs and effects.

After verification, the tool outputs the mask tapes 15 necessary for manufacturing the power-supply system.

Communication between programs could be done dynamically, using well-known networking technologies such as (Transmission Control Protocol/Internet Protocol) TCP/IP, Ethernet, Token Ring, Local Area Networks (LAN), Wide Area Networks (WAN), AppleTalk, and others. The communication between programs could be done through intermediate storage such as files on rotating disks or random access memory. Combinations of networking and storage are also well known, i.e., using networking technology such as Fibre Channel or Internet Small Computer System Interface (iSCSI) to access storage.

Figure 5:
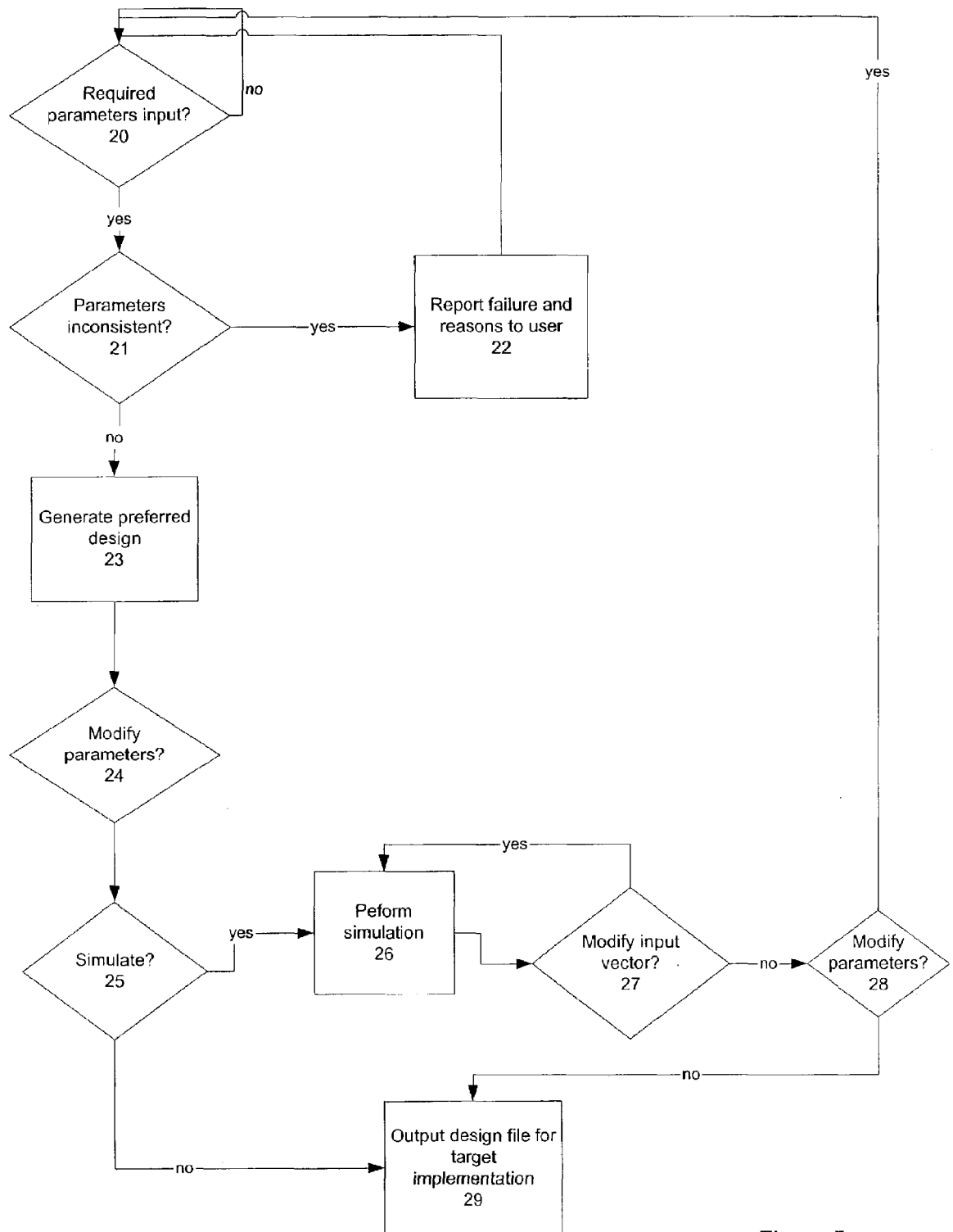
FIG. 5 is a flow chart illustrating the steps that comprise the power supply design process.

FIG. 5 is a flow chart illustrating the steps that comprise the power supply design process. The tool accepts parameters from the system designer describing the requirements and constraints of the power supply to be designed. Parameters accepted from the designer are generally divided into two categories: required and optional. Required parameters are provided by the designer before the tool creates a first design. As depicted in FIG. 5, the design tool waits 20 until required parameters are input by the designer.

Once the required parameters have been input, the tool attempts to generate a power supply design. This effort fails if the designer's requirements are inconsistent or physically impossible. The design tool notes if the parameters input by the designer are inconsistent or impossible 21. If a design cannot be generated, this failure is reported 22 to the designer along with information informing the designer of the reason for the failure. The designer may modify his parameters to allow the tool to generate a new design. The tool waits 20 for the designer to input modified parameters.

If the parameters input by the designer are not inconsistent, the design tool generates 23 a preferred power supply design. The parameters known as design evaluation criteria enable the tool to compare designs quantitatively in order to select a preferred design, i.e., a design that minimizes the maximum of weighted unfavorable variances to selected parameters such as output ripple, step response time, maximum operating temperature, cost, availability, or some combination of the above. Design evaluation criteria are optional parameters and need not be supplied by the designer, as the design system has default criteria. For example, default criteria may be to minimize cost.

Once the design tool has selected a design, the designer may modify 24 one or more parameters. Modification of parameters is equivalent to starting a new design and inputting the new parameters. The design tool proceeds as on a new design with new parameters, starting at step 20. This iterative process allows the designer to explore a range of possible alternative implementations.

The tool may also run a simulation 25 on the preferred design. The designer supplies a simulation input vector, and the tool performs 26 a simulation using an appropriate simulation model. If a circuit simulation is not called for, the tool outputs 29 a design file for subsequent target implementation. Upon viewing simulation output, the designer may modify 27 the simulation input vector to test different characteristics of the preferred design. If so, the tool performs 26 a new simulation on the new input vector. Otherwise, the designer may modify 28 the power supply parameters and the tool generates a new power supply design. The process thus returns to step 20. If a simulation is finished or not called for, the design tool may output 29 a design file for the target implementation. The on-chip design and verification of the power supply system offered by the tool is thus an iterative process, allowing the designer to explore a range of possible implementations, for instance to observe their costs and effects.

Figure 6:
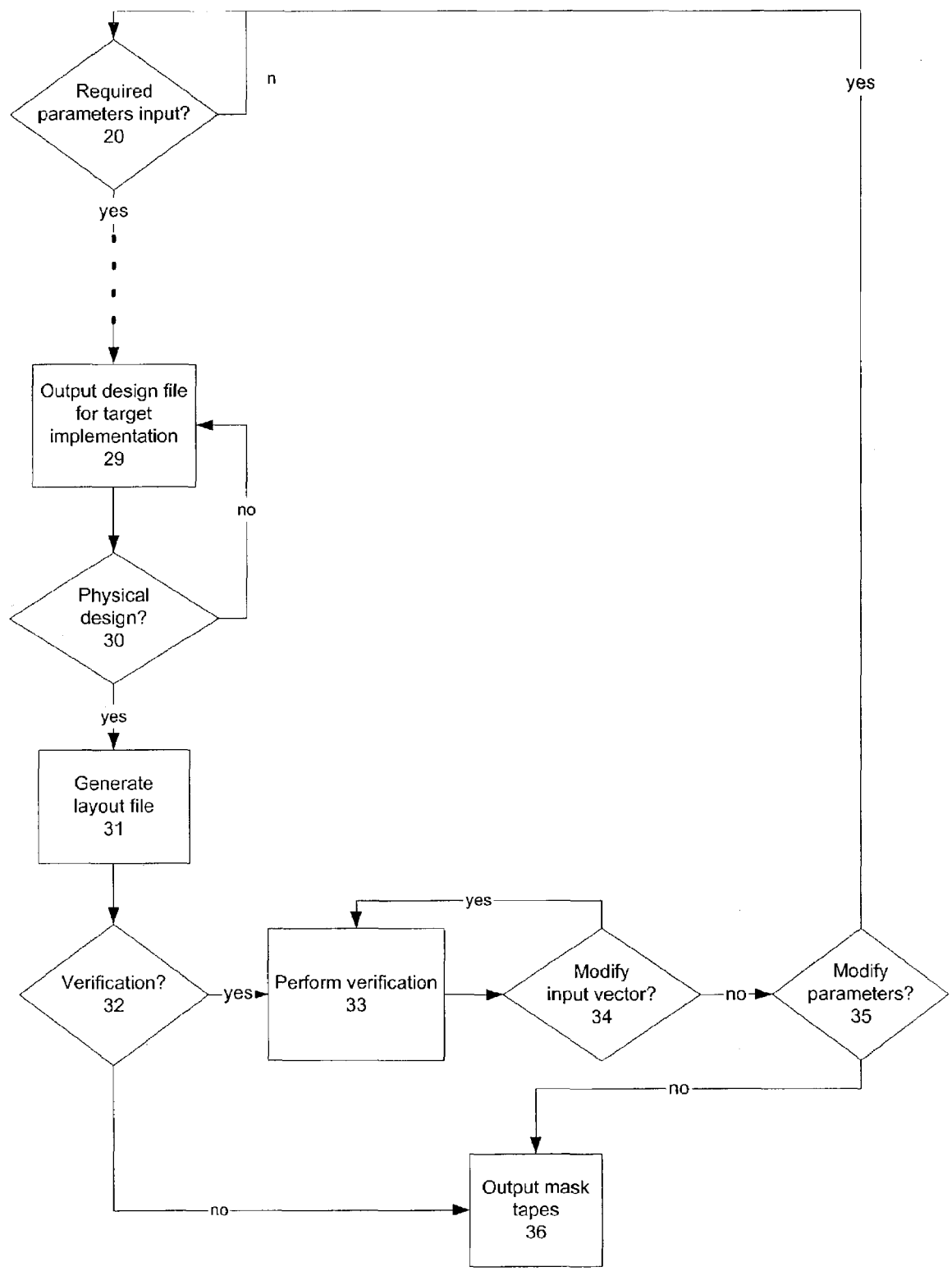
FIG. 6 is a flow chart illustrating the further steps that comprise the additional physical design process.

FIG. 6 is a flow chart illustrating the further steps that comprise the additional physical design process. FIG. 6 is understood to include all the steps of FIG. 5, including steps 21–28, not shown in FIG. 6. Once the design tool has output 29 a design file for target implementation, the tool may further perform physical design 30 and verification of the on- and off-chip power supply system. If the physical design process is not called for, the tool outputs 29 the design file for the desired implementation. Otherwise, the tool generates 31 a layout file of the power supply system. The tool may use a commercially available physical design tool to provide detailed information and guidelines on how to connect the on- and off-chip portions of the power supply system electrically and physically. The off-chip design information includes: each circuit element, the interconnection between the circuit elements as well as between the circuit elements and the on-chip portion, or other physical design suggestions such as thermal and noise reduction guidelines and routing information to aid in printed circuit board (PCB) layout and manufacturing.

The tool can also run a verification 32 on the physical design much like the simulation 25 of the on-chip power supply design. The designer supplies a verification input vector, and the tool performs 33 a verification using an appropriate verification model. If the physical verification is not called for, the tool outputs 36 the mask tapes necessary for manufacturing the power supply system. The designer may modify 34 the verification input vector to test different characteristics of the preferred design. If so, the tool performs 33 a new verification on the input vector. Otherwise, the designer may modify 35 the power supply parameters. Modification of parameters is equivalent to starting a new design and inputting the new parameters. The process thus returns to step 20 and the design tool waits for the designer to input new parameters. If physical design, layout, and verification are complete, the design tool outputs 36 mask tapes necessary for manufacturing. Thus, the physical design and verification of the power supply system offered by the tool is also an iterative process, allowing the designer to explore a range of possible implementations, for instance to observe their costs and effects.

Control Subsystem Design Output

Figure 9:
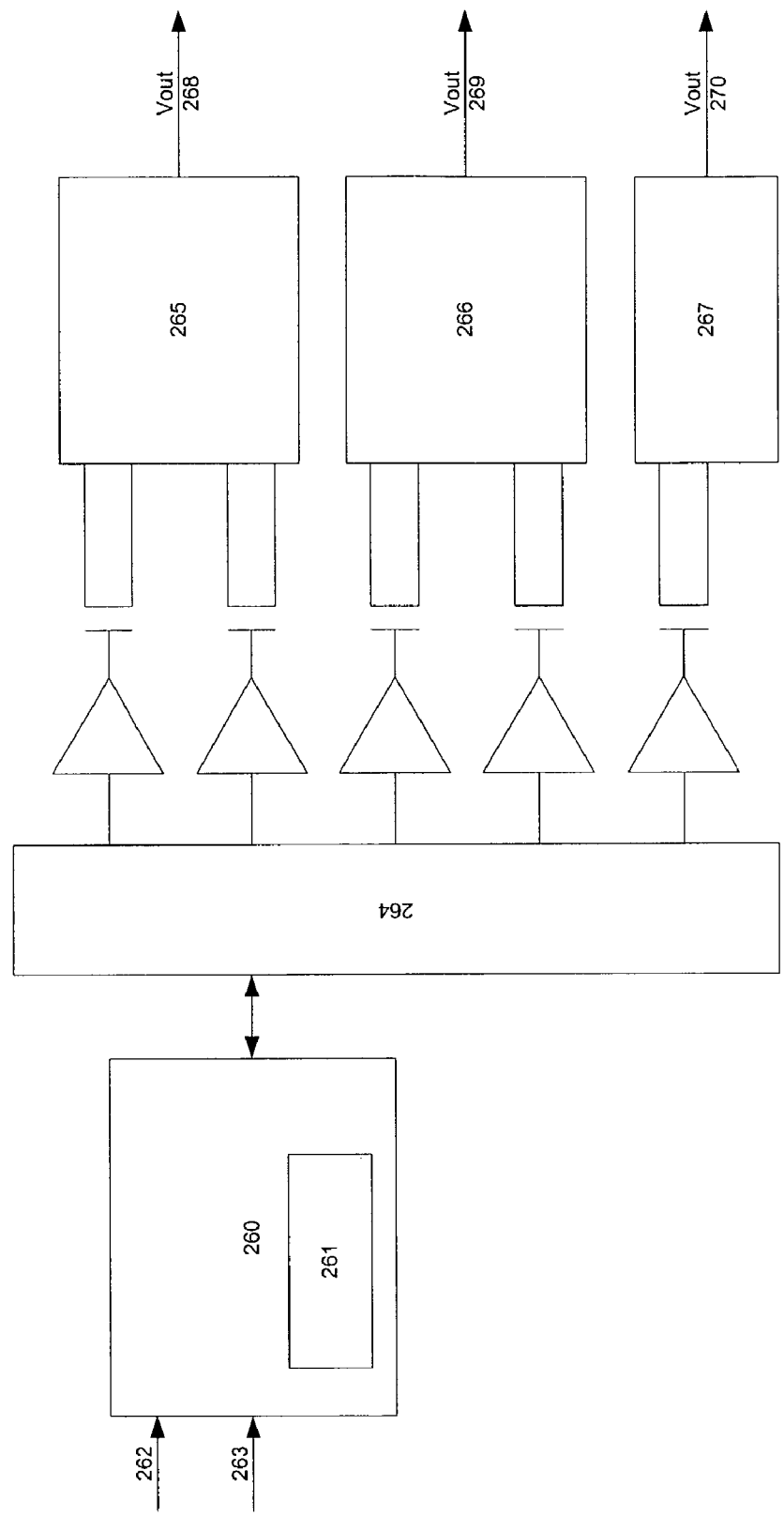
FIG. 9 is a block diagram illustrating a general configurable power supply system.

The control subsystem comprises a controller, multi-controller, or combination thereof used to control the multi-input, multi-output power system, together with their interconnections and the associated hardware and software essential to the control of the power supply. FIG. 9 shows one example of such a control subsystem with multi-controller 264 for configuring multiple power sources 265, 266, and 267. The power sources are configurable automatically according to a digital signal 263 to generate power at different conditions. For example, power source 265 may be configured to a buck topology, whereas power source 266 is configured to boost. In this context, a controller or multi-controller is generally a component or a subcomponent (as, for example, a controller or multi-controller incorporated into a higher-functionality component) of a control subsystem.

Control subsystem design output is divided into two portions. The first portion, known as on-chip design output, mainly characterizes control and low-power elements of the design that would be suitable for integration into an ASIC or configurable controller or multi-controller. Each target implementation implies a different realization strategy for the on-chip portion of the output. The second portion, known as off-chip design output, characterizes the power stages of the power supply together with analog elements (e.g., drivers, switches, etc.) too difficult or expensive to integrate into an ASIC or off-the-shelf configurable controller or multi-controller. The off-chip design information includes: each circuit element, the interconnection between the circuit elements as well as between the circuit elements and the on-chip portion, or other physical design suggestions such as thermal and noise reduction guidelines and routing information to aid in printed circuit board (PCB) layout and manufacturing. The design tool can use any commercially available physical design aid, such as a place and route design aid, to provide information and guidelines on how to connect the two portions electrically and physically.

Generally, the power stages of the power supply are contained in the second portion, while controllers and multi-controllers are contained in the first portion. However, certain topologies (e.g., such as low drop out) can have their power stages moved wholly or partly into the first portion. Other topologies may find it advantageous to move certain elements normally included in a controller into the off-chip portion. This can be desirable when the underlying integrated circuit platform (i.e., field programmable gate array (FPGA) or ASIC logic cell library) provides little or no support for required analog elements (i.e., reference voltage generators, comparators and others). Naturally, the movement of design elements between the on- and off-chip portions affects the necessary connectivity between the two portions. The controller and power source topologies are automatically reconfigurable according to a digital control signal. For instance, in FIG. 9, the controller 264 and power sources 265, 266, and 267 are automatically reconfigurable according to digital control signals 262 and 263.

Occasionally, the off-chip portion of the output is identical for each of the three targets. Then each combination of off-chip portion with one of the functionally similar on-chip portions yields a power supply that conforms to the requirements of the design. Further, each of the combinations have substantially the same operational characteristics and performance, allowing any one version to serve as a prototype for a different combination.

The design tool may generate control subsystem design information for any one or more of three target implementations: ASICs, configurable controllers or multi-controllers, and a rapid prototyping system. The information is included in the design file for the user to survey.

ASIC Target Output

The designer may specify with optional parameters the use of either off-the-shelf configurable controllers or an off-the-shelf configurable multi-controller for ASIC target output. ASIC on-chip target output comprises a netlist indicating the connectivity between logic gates and the required analog cells and I/O pins. Forms of this netlist include: Verilog, Spice or others. The netlist may comprise explicit instantiations or provide high-level logic equations suitable for processing by a design synthesis tool such as Design Compiler by Synopsys Corporation (Mountain View, Calif.). This portion is targeted for the physical design process that is used to generate layout data bases (e.g. GDSII tapes or similar) for the manufacturing of an ASIC.

A simulation can be run on the ASIC on-chip output. The design tool computes operational characteristics using an appropriate simulation model. The data structure for the simulation model can be stored in the library 4 for the design tool to generate a circuit simulation of the design under various conditions. Upon viewing simulation output, the designer may alter the original parameters. Thus the design tool enables the designer to explore a range of possible ASIC implementations.

Rapid Prototyping Target Output

Similar to ASIC target output, rapid prototyping system on-chip output comprises a netlist with either explicit instantiations or high-level logic equations suitable for the physical design process. Inasmuch as most programmable logic technologies provide a very limited set of analog cells, the off-chip portion includes a cluster of analog components around the programmable logic device, connecting the device to the power stages. The prototype can be used to validate system simulation activities and to measure characteristics that are difficult to programmatically generate. For low-volume applications, the rapid prototyping system itself may be a viable production vehicle.

Any of the known FPGA technologies would be suitable to use in a rapid prototyping system, including SRAM based devices such as those made by Xilinx Corporation, San Jose, Calif., fused (or anti-fused) devices made by Altera Corporation, San Jose, Calif. and others.

Configurable Controller Target Output

Configurable controller or multi-controller on-chip output comprises configuration information to image the volatile or non-volatile memory accessed by the configurable controller or multi-controller. This information is loaded into the memory before the controller or multi-controller can begin operation. In the case that the configurable controller or multi-controller incorporates a programmable processor (see below), this information includes the embedded software essential to the operation of the device in the power system. In FIG. 9, for example, the controller 264 and power sources 265, 266, and 267 are configurable according to the data stored in volatile or non-volatile memory 261. According to data in memory 261, power source 265 may be configured to a buck topology, whereas power source 266 may be configured to boost.

Netlist Output

Numerous optional parameters are provided to vary certain characteristics and conventions in the generated netlist. The designer can specify different naming conventions to be used so that the generated netlist integrates into his project-wide naming conventions. This is sometimes necessary as many CAD tools gather information and make inferences based on naming conventions. The design may select one of several different clocking schemes to be used by the generated logic. Just as with naming conventions, CAD tools often expect or require certain clocking conventions in order to perform consistency checking and clock-tree generation.

Providing these generation options avoids the need for the designer to edit or convert manually the generated logic into a form that is acceptable to his CAD tools.

Other parameters control the form of the logic output. One form of logic output is gate instantiations. To utilize this option, the tool comprises a library of logic gate types. It is understood that the library of data structures representing various logic gate types may be included in the library 4 of the design tool portrayed in FIG. 4. The library specifies various attributes of the individual family members such as logic function, pin names and functionality, maximum fan-out, cell name, estimated power consumption, etc. When generating logic, the design tool searches the library for the appropriate cell type by comparing the needs with the capability of each potential candidate present in the library. The design tool is provided with a cell library that targets a generic or typical manufacturing process, however, the designer can add or specify additional libraries that reflect the target manufacturing process.

The design tool comprises a library to target the logic generation capabilities at the rapid prototyping system. If multiple rapid prototyping systems are available, they may each have their own logic library. It is understood that the library for the rapid prototyping system is included in library 4 in FIG. 4.

Another form of logic output is register-transfer-level hardware design language (HDL) suitable for input to a synthesis tool. At least two HDLs are well known in the industry, Verilog and Very High Speed Integrated Circuit Hardware Design Language (VHDL). Most of the issues described above, e.g., naming and clocking conventions, apply to this environment also. By modifying how the HDL is generated, different types of clocking structures are inferred by the synthesis CAD tools that convert these descriptions into logic gates. Unfortunately, the HDLs themselves are often inadequate to specify the final result. Additional information may be generated by the design tool to assist the synthesis tool in inferring the correct structures. This information may be provided within the HDL itself, in the form of specialized comments, or it may be provided in external files or a combination of both. The designer can specify with optional parameters the target synthesis tool for which the design tool is to generate the additional information.

Similar to the logic library, the design tool has libraries of data structures representing analog cells both for internal (i.e., on-chip) and external (i.e., off-chip or discrete) uses. It is understood that the library of analog cells is included in library 4 of FIG. 4. Just as with logic generation, the tool searches the analog libraries for cells to use during the design generation process. The library provided attributes not only help the tool select between functionally equivalent cells but it also provides vital information to the prediction or simulation abilities of the tool.

Another issue for the design system to address is the timebase. Unlike many analog power controllers, the digital controllers of some topologies that are generated by the design system require a period clock signal to function. Many design systems rely on an external timebase to generate their clock, either by using the timebase as the direct clock or by generating a clock synchronized to some multiple of the timebase (the multiple may be fractional or integral). In generating a power supply system, the tool designs the timebase generator so that it does not depend on the power being generated by the controller that it is operating. In generating a power supply system, the tool can generate logic to create a timebase or utilize an externally provided one. Further optional parameters may allow a generated timebase to be available for use by logic outside of the power supply section.

The design tool can provide a multiplicity of control schemes. One control scheme is for the designer to indicate a value to the tool through an optional parameter and have the tool embed this setting in the logic of the design. This scheme has the advantage of allowing the tool and the logic synthesis programs to propagate the fixed setting throughout the design with the possible realization of savings in control logic through well-known techniques of logic minimization.

Another control scheme is to provide a programmable register to contain the value so that it is mutable over time. A host interface (described below) is used to alter the value of the register and thus control the feature. Variations of this scheme exist for controlling the initial value of the register upon system power-up. In one variation, no control is provided and the register state after power up is unspecified. In another variation, the designer provides a fixed setting for the register to be guaranteed at power-up. Another variation is to specify the initial state of the register through the use of non-volatile memory. If the non-volatile memory is electrically alterable, e.g. Flash, or Electrically Erasable Programmable Read Only Memory (EEPROM), then the designer may specify through optional parameters that the device be provided with the necessary logic to allow the host interface to modify the values of the non-volatile memory. The design tool has the ability to generate the initial value of the non-volatile memory based on optional parameters supplied by the designer. In the case of alterable non-volatile memory for which the designer has included host access, the generated software Application Program Interface (API) provides mechanisms to modify the appropriate sections of the non-volatile memory on a feature-by-feature basis.

Some of the features that can be controlled through these schemes include: event notification, power event actions, sequencing and others.

Topology Library

The topology of a power stage is a blueprint for the power stage, including its constituent elements, their interconnections, and their external connections, in particular, connections to the control subsystem. The operational characteristics of a power stage are implicit in the topology and the control strategy, as implemented. The tool has access to a library of power stage topologies, described in any number of high-level languages (e.g., C, C++, Verilog, VHDL, etc.). For each topology, schematics, applicable control strategies and cross-control strategies, as well as typical cost and performance metrics are catalogued. The design tool can search the library for data structures representing different topologies, applicable control strategies, and applicable cross-control strategies that meet the requirements as specified by the designer. Examples of topologies include: buck, boost, buck boost, fly back, forward, charge pumps; linear regulators, linear low drop-out regulators and others. The library is not limited to a single representation of each of the known power supply topologies. Different instances of a single topology allow variation in implementations. Examples of implementation variations include: supported power ranges, supported operating modes, mechanisms for measuring power consumption and others.

In FIG. 4, the topology library is understood to be included in library 4. The design tool communicates with the library 4 to select an optimal design based on the default or designer supplied design evaluation criteria. The topology library may supply data stating that multiple topologies are available to meet the design parameters. The topologies may offer features or characteristics not required by the designer. For example, two topologies of boost converters might be suitable. One topology might offer additional optimizations such as zero voltage switching, i.e., switching the FET (Field Effect Transistor) off when the voltage across it collapses to zero, reducing noise and improving system efficiency. It is understood that the power devices can be FETs, Bipolar Transistors, Insulated Gate Bipolar Transistors (IGBTs), or any other semiconductor power devices. In some instances, the topology requires an additional ASIC pin that might be unavailable or otherwise undesirable to the designer, while another topology instance may save the additional pin at the expense of more noise and less system efficiency. With the design tool, the designer can explore the possible alternative topologies.

The designer can explore possible alternative power supply topologies for the power supply system design by altering design parameters 2. Certain parameters for each output voltage control the selection of the power supply topology. These topology parameters are optional inasmuch as the tool is able to automatically select a power topology that satisfies the designer's requirements through default evaluation criteria. For instance, for input voltage of 10 V to 25 V buck may be the default power topology. Some topologies may offer options about the locations of certain components. For instance, an FET switch (or any other type of power switch) could be realized as either an on-chip or an off-chip component. The design tool, in the absence of instructions otherwise, makes a selection of the preferred power supply design based on criteria such as the predicted power dissipation of the switch, used process, or the availability of switches in the analog cell library. However, the designer may use an optional parameter to override this selection and force the switch on- or off-chip. For example, altering the topology and on-/off-chip selections will change the number of connections (pins) between an ASIC and external components, so an optional parameter regarding ASIC pin-count limitations would have the effect of forcing a particular FET switch (or other power device) on- or off-chip.

Control Strategy Library

The topology of a power stage details, among other things, the signals input to the controller that monitor the operation of the power stage and certain of its constituent elements, and the signals output from the controller that control the operation of the power stage and in particular that regulate the output voltage. A power stage control strategy is essentially an algorithm that processes the input signals into output signals. The controller or multi-controller can be digital, analog, or some combination. With digital control, inputs and outputs are "numbers" manipulated by digital logic. As a result, control strategies can be described in any of a number of standard high-level languages (e.g., C, C++, Verilog, VHDL, etc.), for subsequent realization in a controller.

Just as an algorithm comprises operators and operands, where certain operands require initialization and certain other operands are unaffected by the algorithm (constants), so a control strategy comprises settings (numeric operands) and switches (logical operands), which are used to mate a specific control strategy to a specific power stage (embodying a specific topology). Control strategy settings and switches are thus enablers to computer-aided design of multi-output power supplies.

Just as there are many power stage topologies, so there are many control strategies for different modes of operation, regulatory requirements, extraordinary performance requirements, etc. Hence, the design tool a uses library of data structures representing control strategies.

In FIG. 4, the control strategy library is understood to be included in general library 4. When a user attempts to generate a preferred power supply design 3, the design tool communicates with the library 4 to select a design based on the default or designer supplied design evaluation criteria.

Cross-Control Strategy Library

In a multi-output power supply, the control subsystem controls not only the constituent power stages, but also any defined interactions among them. The startup of a multi-output power supply, for example, may be accomplished by a sequencing process, in which power stages are started up in a prescribed order, in accordance with prescribed timing. Another example of a pre-defined interaction is the interaction of controllers for the purpose of current sharing.

Algorithms used to control the interaction of multiple power stages are referred to as cross-control strategies. As in the case of control strategies, cross-control strategies comprise settings and switches used to mate a specific cross-control strategy to an ensemble of power stages (embodying a specific ensemble of topologies). The logic of cross-control strategies can likewise be described in any number of high-level languages (e.g., C, C++, Verilog, VHDL, etc.). One method for implementing a cross-control strategy, for example, is to append it to each of the control strategies of the constituent power stages, creating in the process, a new set of control strategies, each with a new set of inputs, outputs, setting, and switches.

Just as there are many control strategies and combinations thereof, so there are many cross-control strategies, for sequencing, for synchronization, for current sharing, etc. Hence, the design tool further comprises a library of data structures representing cross-control strategies.

In FIG. 4, the cross-control strategy library is understood to be included in general library 4. When a user attempts to generate a preferred power supply design 3, the design tool communicates with the library 4 to select a design based on the default or designer supplied design evaluation criteria.

A multi-output power supply presents unique problems (as well as opportunities) to the designer. Accordingly, the tool performs a variety of cross-controller design optimizations. For example, substantial logic associated with a host interface can be shared between each controller. In this instance, for example, the event notification system can be optimized so that a single event is presented to the host for any combination of events in any of the individual power supplies, thus reducing logic gates. Other optimizations can be applied that allow the sharing of logic within a controller itself, for example, a timing generator may be used to control the time base for multiple controllers. This type of optimization is sometimes required to support synchronization of power supplies, avoiding potential audible noise due to cross-controller beat frequencies in the audio range.

Off-the-Shelf Controller Library

The tool further comprises a library of data structures representing off-the-shelf controllers (in the form of components and subcomponents), which includes user-configurable controllers and multi-controllers, as well as controllers and multi-controllers capable of inter-communicating. The library can be described by any number of high-level languages (e.g., C, C++, Verilog, VHDL, etc.). For each controller, the applicable topology or topologies, control strategies and cross-control strategies, schematic and interface specifications, as well as the manufacturer part number are catalogued. For each user-configurable controller and multi-controller, any settings and switches together with their possible values are also catalogued. The design tool searches this library to extract specific controllers, multi-controllers or combinations thereof applicable to the requirements of a given design, and further to select the preferred controller, multi-controller, or combination for the design.

In FIG. 4, the off-the-shelf controller library is understood to be included in general library 4. When a user attempts to generate a preferred power supply design 3, the design tool communicates with the library 4 to select a design based on the default or designer supplied design evaluation criteria.

Flexible Controller

A flexible controller is a component or subcomponent (as, for example, a flexible controller incorporated into a higher-functionality component) controlling one or more power stages. A flexible controller is a hybrid of the hard-wired logic of an ASIC and the completely uncommitted logic of an FPGA. It can be configured to control one or more topologies, using one or more control strategies by altering the contents of its memory, which is preferably non-volatile, but can be volatile or non-volatile. As used herein, non-volatile memory includes: flash memory, erasable programmable read-only memory (EPROM), electrically erasable programmable read-only memory (EEPROM), fuses, anti-fuses, metal options, laser trimming and others. The non-volatile memory can be burned in using a laser source. An optional parameter input to the design tool controls the presence or absence of a flexible controller, and other optional parameters can control the details of the functioning of the flexible controller itself.

Flexible controllers are synthesized using flexible controller templates, which are computing structures architected to provide memory, computation, and communication resources essential to realize the control strategies applicable to a class of power stage topologies. Flexible controller templates can also include analog or mixed analog-digital controllers that can be configurable by the configuration data. Because there are so many styles of computing, so many topologies, and so many more combinations of topologies in use, the spectrum of template possibilities is broad.

Figure 7:
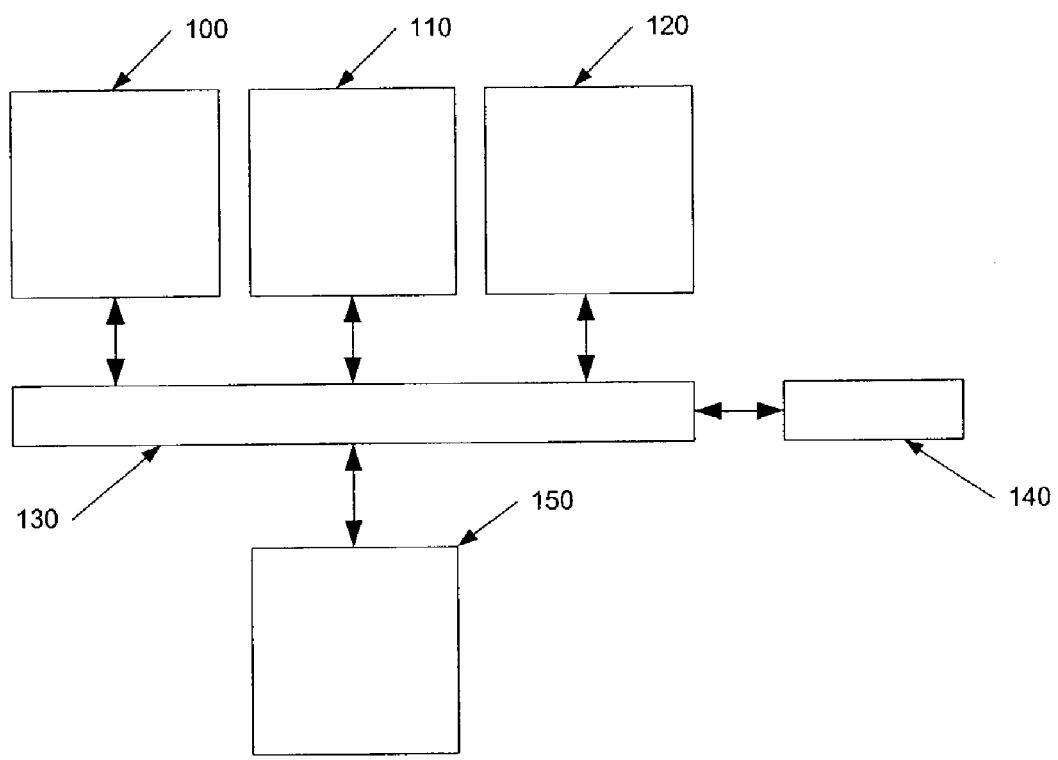
FIG. 7 is a block diagram illustrating one embodiment of a flexible controller template.

FIG. 7 shows one embodiment of a flexible controller template. Multiplexer 130 is controlled by non-volatile memory 140. Depending on the setting of non-volatile memory 140, one of the controllers 100, 110 or 120 is coupled to power stage 150. Each of the individual controllers 100, 110 and 120 are designed to handle specific topologies. By controlling the contents of non-volatile memory 140, the overall unit takes on the personality of any of the individual controllers 100, 110 or 120.

Figure 8:
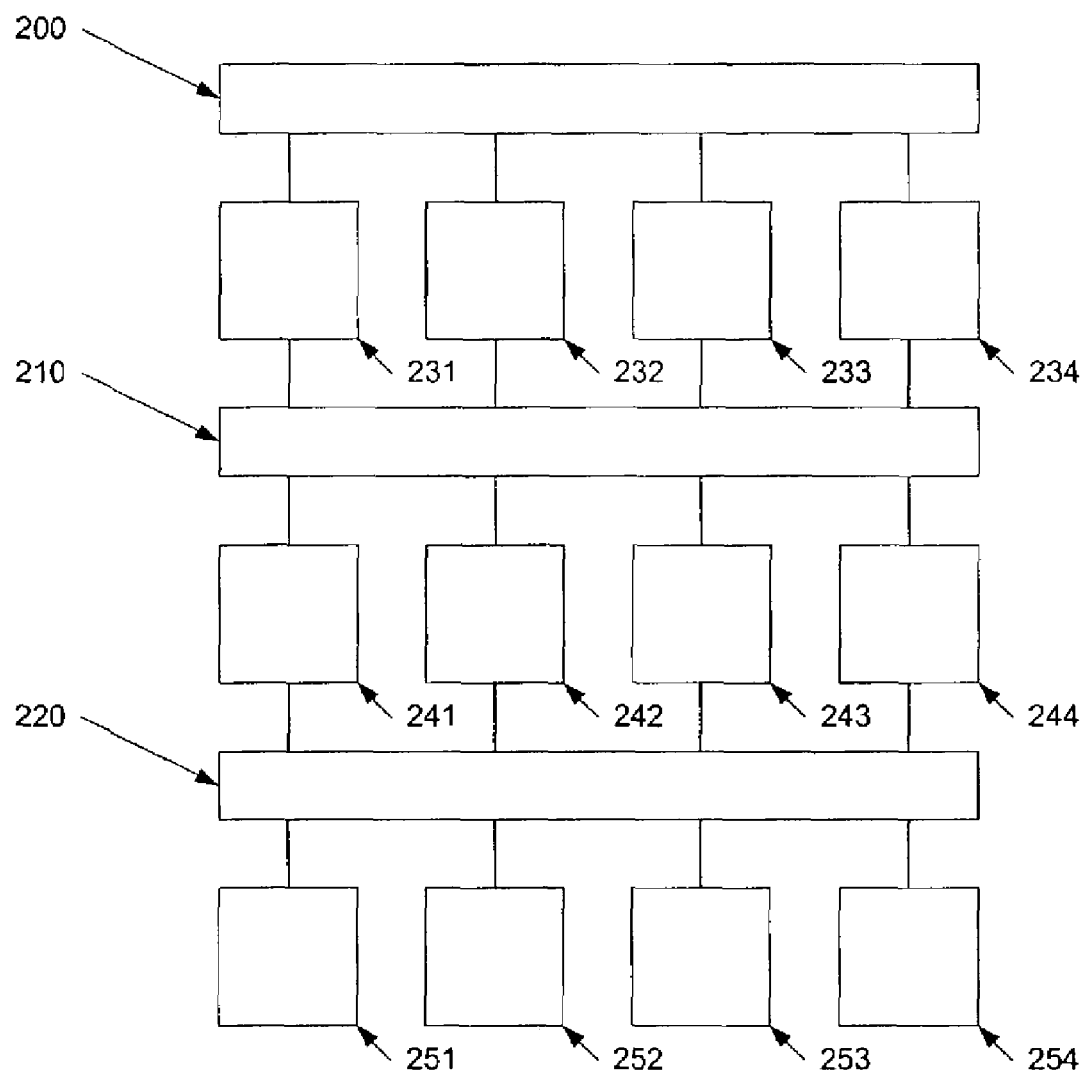
FIG. 8 is a block diagram illustrating a flexible controller template featuring an alternative architecture.

The architecture of the template of FIG. 7 is potentially inefficient in that structures that exist in one or more of the controllers 100, 110 or 120 are not shared. Alternative forms of flexible controller templates could share redundant structures. FIG. 8 shows a flexible controller template featuring an alternative architecture. I/O cells 251–254 form the external connections between the controller and the off-chip portion of the power supply design. Typically these are pins of an ASIC. Analog cells 241–244 are connected through connection network 220 to I/O cells 251–254. Not shown is the non-volatile memory that controls the operation of connection network 220. Some of analog cells 241–244 are designed to receive signals from I/O cells 251–254. One examples of this type of cell system is a comparator. The comparator compares the voltage level available on one of the external I/O cells 251–254 against a reference voltage that is generated internally.

Others of the analog cells 241–244 can be designed to output control voltages or power. An intermediate sized MOSFET could function as either the drive for an external switch or as the source of regulated power.

Analog cells 241–244 are coupled to controllers 231–234 through connection network 210. Differing controllers 231–234 may be implemented depending on the state of the input analog cells. The controllers 231–234 are coupled to host interface 200 for communication and monitoring by an external CPU.

The number and type of controllers 231–234, analog cells 241–244 and I/O cells 251–254 could vary from specific instance to another, providing a variety of configurations. A single device may have different controllers with varying capabilities while having the same number and type of analog and I/O cells as another device. Likewise, a device may differ in the number and type of analog and/or I/O cells in any combination.

Additional combinations can be realized by combining the operations of a plurality of analog cells 241–244 and/or I/O cells 251–254. For example, two cells, each consisting of a single power FET, could be connected in parallel creating the functional equivalent of a single power FET cell with enhanced characteristics. This concept is easily expanded into an entire array of relatively low power cells, providing the ability to configure a plurality of higher powered cells.

Flexible controller templates can be architected for synthesizing multiple inter-communicating flexible controllers. In this case, the memory, computation, and communications resources provided by the template include, in addition, those resources needed to realize applicable cross-control strategies (e.g., sequencing at startup, current sharing, etc.). Flexible controller templates can further be optimized for specific applications such as mobile communications, mobile computing, cameras, etc. Application-specific templates could prove critical in enabling the low-cost, low-power multi-controllers essential for mobile applications. Alternatively, templates could be optimized for distributed multi-output power supplies, incorporating, for example, the ability to reconfigure around failing or failed power stages, simplifying the design of fault-tolerant systems.

Flexible controller templates may take a variety of forms. One form could be that of an incomplete design, suitable for customization via metal mask, as in the traditional "master slice." Alternatively a template may take the form of a library of circuits together with the rules and tools for synthesizing a flexible controller.

Accordingly the design tool comprises a library of data structures representing flexible controller templates to synthesize cost-effective controllers and multi-controllers for the diverse and ever-expanding universe of applications requiring multi-output power supplies.

In FIG. 4, the flexible controller template library is understood to be included in general library 4. When a user attempts to generate a preferred power supply design 3, the design tool communicates with the library 4 to select an optimal design based on the default or designer supplied design evaluation criteria.

Programmable Processor

Portions of a flexible controller can be easily and cost-effectively implemented using a programmable processor. Examples of functionality that may be implemented using such a processor include: interfacing with external CPUs (host communications) and/or other power supply controllers (intra-system communications), sequencing, current sharing, mode switching, timebase control, interrupt generation, battery monitoring, basic output regulation and others. Optional parameters input to the design tool can control the details of the desired functionality of the programmable processor itself. Flexible controllers incorporating a programmable processor will need to have a program for the processor to execute to perform these functions. The program can be automatically generated by the tool and supplied to the designer. The program is generated based on the parameters input by the system designer. Some embodiments of the design would store the program in non-volatile memory suitable for immediate use by the processor. Other embodiments might provide an alterable program store, e.g. Static Random Access Memory (SRAM) or Dynamic Random Access Memory (DRAM), wherein the program is loaded after powering up. Clearly, in this case, the functionality associated with the processor cannot be required in order to generate power for the agents responsible for loading the program into the memory. A combination of these two methods might also be used, e.g., a small program resident in non-volatile memory might be sufficient to power the system until a secondary program is loaded into volatile memory for subsequent operation.

The generated program may be customizable, i.e., the system designer can alter or augment the generated program to suit his needs. The program may be generated in a well-known high-level language such as C or Java. With the proper interconnection(s) to the remainder of the system, the programmable processor could potentially serve any need of the system designer, replacing all other programmable elements in the system.

Accordingly, the flexible controller templates may incorporate by reference, one or more programmable processor templates, from a library of programmable processor templates.

In FIG. 4, the programmable processor library is understood to be included in general library 4. When the tool is attempting to generate a preferred power supply design 3, the tool communicates with the library 4 to select an optimal design based on the default or designer supplied design evaluation criteria.

Host Communications Link

A host interface may optionally be incorporated into the design, as in FIG. 8 item 200. The host interface allows an external agent, such as a microprocessor, to interrogate the status and control various aspects of a generated power supply. An optional parameter input to the design tool controls the presence or absence of a host interface, and other optional parameters can control the details of the functioning of the interface itself. Possible interface options include well-known industry standard communications links such as Universal Serial Bus (USB) and Inter-integrated circuit ($I^2C$), RS-232, and others. Other possible options might be on-chip interfaces including one or more of the proposed standard on-chip interconnection buses such as the Virtual Component Interface from the Virtual Socket Interface Alliance (VSIA) and others. Lastly, a non-industry standard interface comprising a minimum of connecting logic may be provided.

The status information that is available via the host interface for a power supply can also be controlled by the designer though optional parameters supplied to the design tool in the design initiation process. For example, logic that measures cumulative power consumption can be added to one or more output voltage supplies. The presence of this logic allows the external agent to track system power consumption for each of the different output voltages. The actual realization of this logic may be different for each power topology. Indeed in some topologies this capability may be unavailable, inaccurate, or only functional in certain operating modes. Other types of status information that may be enabled include: input and output under- and over-voltage detection, battery status (for battery powered systems), operating mode indications, input and output voltage, thermal status, or any combination of the above.

The host interface enables an external agent to send information to the power supply to instruct it to alter its behavior. For example, an agent (via the host interface) may instruct a power supply to turn off or on or to switch from one source of input power to another. Other potential behaviors that may be modified through the host interface include: output voltage levels, under- and over-voltage protection actions, under- and over-voltage notification, inter-supply synchronization, operating mode, sequencing, soft-start, thermal protection, short-circuit protection, or any combination of the above. Protection actions include: quick cut-off, slow cut-off, delayed cut-off, quick recovery, slow recovery, delayed recovery, or no action. Modification of these behaviors may override the default behavior for these actions that was programmed into non-volatile memory.

Most power supply topologies have several operating modes, determined by the control strategy. For example, a boost converter can operate in continuous and discontinuous modes. Additional operating modes of some supplies include: low power (sleep), extremely low power (deep sleep), and others. Some control strategies automatically transition between the operating modes and simply allow the host interface to determine which mode is currently being used. Other control strategies require host intervention to enter a new mode. The latter may be useful with certain feedback techniques that have difficulty maintaining regulation with extremely light loads (i.e., virtually no load demand).

The host interface also enables the power supply to notify the external agent of various events. Event notification can be provided either though a message passing scheme (e.g., when the selected host interface technology allows bi-directional communication), interrupt signaling or polling. Possible power events include: input under- and over-voltage, output under- and over-voltage, output short circuit, low battery, or any of the protection or recovery actions. A mechanism is provided to enable, disable, and acknowledge the delivery of these events to the host. Independent of delivery to the host, a mechanism is provided to log the occurrence of an event internally. As with all host interface features, the presence or absence of each of these capabilities can be controlled via parameters within the tool.

For instance, associated with each power event is a consequential action to be taken. Possible actions include slow or rapid shutdown of one or more power supplies. The action to be taken may be automatic or initiated via the host interface, at the option of the designer.

Many of the host interface options and capabilities require different logic implementations for differing topologies, voltages, input sources, etc. The tool selects the specific logic implementation based on data stored in the library. Often, the best implementation of a desired status indication is not to provide it directly but to calculate it from other measurements. Sometimes, the measurements are repeated at multiple points in time before sufficient information is available to compute the requested quantity. These measurements and calculations are performed by the external agent after the raw information has been collected via the host interface. The tool enables the electronic system designer to remain ignorant of the details of these measurements and computations.

Generated Host Interface Software

The design tool can generate customized software implementing the appropriate algorithm for the host interface. The algorithm might be expected to support, for example, turning on or off input power, or switching from one source of input power to another. The design tool refers to the library to generate the customized software. The generated software presents a standardized application program interface (API) to the upper layers of software, allowing the software developer to ignore the differences between power supply topologies. For example, if the software needs to retrieve a particular status indicator, (e.g., present power consumption) then a standardized API call is made. The upper level software using the API is ignorant of the actual power supply topology. The implementation of the API call generated by the tool is customized to perform the information retrieval and computation required by the specific topology.

The generated code calls subroutines provided by the designer to read and write logic registers within the generated power supply via the host interface. The generated code also expects to be called so that computations that collect data over time can be performed. Examples of this type of computation involve collecting historical power consumption and others.

The generated code is compatible with the other elements of the designer's software environment. Parameters are provided to describe the target software environment so that the generated code is compatible with it. Examples of these parameters include: programming language (C, C++, C#, Pascal, Visual Basic, Java, etc.), machine word width (i.e., the width of an integer variable—8-bits, 16-bits, etc.), or naming conventions. Some programming language selections may provide other options such as a preference for the use of bit-fields within structures versus shifting and masking and others.

Intra-System Communication Link

As described above, a power system may have multiple output voltages. In some applications, a single multi-controller design may support all of the multiple output voltages. An optional parameter input to the design tool controls the presence or absence of an intra-system communication link, and other optional parameters can control the details of the functioning of the intra-system communication link. The resulting multi-controller design may take the form of ASIC logic, configuration information for a configurable multi-controller, or a rapid prototyping system. It is also possible (as in the case of "distributed" power systems) to implement multiple output voltages with multiple inter-communicating controller or multi-controller devices. The link could be a single shared bus, like I2C or a serial link like RS-232. Indeed, any of the well-known forms of communication could be used.

The tool allows the system designer to select a communications protocol and specify link control parameters. Communications among ASIC and configurable multi-controllers are supported. The tool generates link interface logic and link control information and provides the connectivity information to the system designer so that the intra-system communication link can be constructed correctly.

Various types of information may be moved through the link. Some examples of intra-system communication described below include: synchronization to eliminate cross-controller beat frequencies, current sharing, timebase control, mode switching, sequencing and others. Devices may share information across the link to allow the system to determine aggregate quantities such as battery life, for example. When the link concept is combined with the programmable processor concept, the result is a system of communicating devices that can share information under programmable control.

Some instances require inter-controller links and cross-controller communication to share information. For example, proper support of current sharing between two output stages is best done when the two controllers operate in a mode that shares information between them. The logic that implements this type of information exchange is inserted when requested by the designer. Optional parameters allow the designer to control the logic that implements current sharing per se.

Cooperative Loads

The intra-system communications link may also be used to enable communications among controllers and cooperative loads. A cooperative load is any load with the capability of inter-communicating with its power stage controller for the purpose of exchanging status and control information useful in optimizing the performance of the power stage. An example of a cooperative load is a high-performance microprocessor whose demand for power switches from one level to another, and so is designed to cooperatively communicate the timing of such switching to the power supply control subsystem, to minimize the impact of the associated transients. An optional parameter input to the design tool controls the presence or absence of cooperative loads. In FIG. 3, for instance, cooperative load 314 can communicate with multi-controller 300 via connection 315.

Sequencing and Synchronization

Another issue for multi-output power supplies is sequencing. The system designer may specify the order and timing in which multiple power supplies are activated during system power-on. The tool allows the designer to specify the order and time delay for the various output voltages. In one case, the design might specify that only a single output voltage is activated and the others remain off. This one supply could power an agent that could then control the turning on of the other supplies via the host interface. In another case, each power supply is specifically designated to activate in a predetermined sequence with predetermined time intervals between their activation. Many other cases are possible. In each case, the design tool generates the required logic to control the activation of each power supply as specified.

If a power supply design specifies switching from one source of input power to another, a process similar to that described above may be specified. In one case, the design might specify that certain output voltages are deactivated and then reactivated in a specified order and in accordance with a specified timing. In this case the tool operates as described above.

Multi-output power supplies require synchronization of the time base of the individual controllers in order to avoid audible noise due to beat frequencies. Synchronization may be accomplished with a fixed switching frequency (with regulation being supplied by adjusting the duty cycle) that all of the controllers operate from or a suitable integral or fractional multiple thereof. Some modern controllers operate by varying their switching frequency (as well as their duty cycle), to which all of the other controllers must be synchronized. In a multiple controller system this poses a problem as only one controller may be allowed to vary its operating frequency at an instant in time. Thus either the system contains only a single variable-frequency controller or the other controllers have the ability to operate in a fixed-frequency mode. Bi-modal controllers (fixed- and variable-frequency) are also well known. In some instances, multiple bimodal controllers are present in the design. In this case, the dynamic state of the system comprises one of the controllers operating in the variable-frequency mode (master) while other controllers operate in the fixed-frequency mode (slave). Generally, the master controller is selected to maximize system efficiency. It is understood that the appointment of a master controller may be temporary in nature, i.e., when the system load changes it may become preferable to change which of the controllers is the master. The logic to designate the master as well as detect when a master transition is needed may be realized in the generated API software though it could be done in generated logic.

Magnetics Explorer

Many of the power supply topologies use magnetic components, i.e., inductors and transformers. Sometimes, the system designer determines that standardized components are inadequate and may need to develop custom magnetic components. The design program additionally offers support for the construction of custom magnetic components. One section assists in the physical design of these components allowing the specification of core size, core material, bobbin size, wire type, insulation type, number of windings, winding geometries, or some combination of the above. Another section provides estimates of the physical configuration and electrical parameters of these custom components. The predicted electrical characteristics are coupled back into the electrical characteristic computation and simulation capabilities described above. The thermal characteristics of the device can also be evaluated by combining the physical description with the electrical characteristics of the chosen topology. A set of manufacturing instructions is generated by the tool, allowing the manufacture of the custom component.

Power Supply System

FIG. 9 is a block diagram illustrating a general configurable electrical power supply system with multi-controller 264 and multiple configurable power sources 265, 266, and 267. Each configurable power source may be of a different topology, for example, 265 may be boost, 266 buck, and so on.

A configurable power source is a power source that is configurable according to a digital control signal i.e. a digital control signal input to the configurable power source determines the output power conditions of the configurable power source. The power source can be configured automatically according to a design tool or manually by a user. In FIG. 9, the configurable power sources are configurable automatically according to a first digital control signal 262 and configuration data input via a second digital control signal 263 into non-volatile memory 261. Control interface 260 measures and stores the input signals 262 and 263 for automatic configuration of controller and power sources. The power sources are configurable automatically to generate power signals at different conditions depending on the configuration data. Configuration data comprises data that can configure the structure of the power supply system to generate power signals at different conditions. In an alternative embodiment configuration data can comprise data that results in physical configuration by fuses, anti-fuses, or metal mask options. The different conditions generated by configuration data comprise output voltage, sequencing information, current capability, drop-out voltage, topology, and operational conditions such as overload protection. For instance, the power sources 265, 266, and 267 can be configured to different topologies such as buck, boost or flyback, and output signals 268, 269, and 270 can be configured to different voltages.

The first digital control signal 262 can comprise real-time or power management data, which is data generated in the course of monitoring the operation of the power supply system and adapting to changes in the operating environment. Examples include data associated with the switchover of one input power source to another, with events generated by a cooperative load, and with sleep mode management.

More generally, the controller 264, may be a finite state machine for controlling corresponding power sources 265, 266, or 267 wherein the digital control signal configures or reconfigures the finite state machine by initializing or modifying the settings and switches of the state machine. The controller, flexible controller, or multi-controller 264 in this case, can be implemented as digital, analog, or some combination (i.e. analog-digital). The power sources have different settings depending on the signals input to controller 264. For instance, a second power source can depend on the first power source during a powering up sequence, or there can be a hierarchy of power source modules that depend on each other for inputs.

It is understood that FIG. 9 is one example of a configurable power supply system; there may be different numbers of chips or modules with different power source arrangements. For example, the output power signals 268 and 269 are of different voltages, but it is contemplated that they may be of the same voltage. Or, in another embodiment a configurable power source may generate multiple voltages to be received by a single module. Or, rather than generating output voltage, a configurable power source can store voltage.

Alternatively, a configurable multi-controller may control one or more power sources which are not themselves configurable, in addition to power sources that are configurable. For example, a first configurable power source may be digitally configurable, while a second power source may be an analog or off-the-shelf power source. FIG. 3 illustrates a discrete power source comprising controller 316, power stage 317, and output load 318, which are controllable by multi-controller 300. Digital controllers can be mixed and matched with programmable and configurable analog or mixed analog-digital controllers, to achieve optimal designs. In another embodiment, the first and second power sources are configurable by a common controller, and a power source is configurable automatically according to a digital or analog control signal.

The configurable electrical power supply system can be modeled using a simulating model representing the multiple configurable power sources. The model simulates configurability to generate different voltage representations. A digital control signal representation is input to the model to cause simulation of automatic configuration of a configurable power source.

The electrical power supply system can further be tested by a tester coupled to the outputs 268, 269, and 270. The tester comprises a controller and a memory to determine the voltages generated by the configurable power sources. The tester can be a self-tester, for example in FIG. 9, control signal information can be input back into the control interface 260 via input 262. The self-tester, upon receiving real-time test data via input 262 can further configure the power supply system to optimize performance. For example, after the power supply system is manufactured, the controllers can be tested to determine whether they generate the correct voltages.

Additionally, the electrical power supply system can be monitored by another controller coupled to the outputs 268, 269, and 270 to determine the voltages generated by configurable power sources 265, 266, and 267. For example, the controller can monitor the voltages output by the configurable power sources and generate a warning if voltage outputs are wrong. The electrical power supply system can be monitored by a console that comprises a display for indicating the different voltages generated by the configurable power sources.

Similarly to the uProcessor 320 in FIG. 3, the control interface 260 in FIG. 9 automatically configures the configurable power sources according to digital control signals 262 and 263. The control interface 260 comprises a non-volatile memory 261 to store the digital control signal 263. The interface is coupled to the configurable power sources 409 and 412 via controller 264. It is contemplated that the processor may comprise a host processor while the multiple configurable power sources are nodes on a network. The processor automatically configures a power source according to digital control signals 262 and 263.

A processor may comprise an instruction set that configures a configurable power source. The digital control signal functions as a digital control instruction to the instruction set. The digital control instruction causes the processor to configure a configurable power source to different conditions. The different conditions comprise output voltage, sequencing, current, and topology.

The power supply system is more generally a power signaling interface comprising a first signal node to generate a real time signal and a second signal node to generate configuration data. The real time signal can be a feedback signal from the output signals 268, 269, and 270, or some other real time signal from another module in the system. For example, in FIG. 9 the real time signal is generated and sent via 262 to control interface 260. More generally, the real time signal comprises power management data, which is data generated in the course of monitoring the operation of the power supply system and adapting to changes in the operating environment. Examples of power management data include data associated with the switchover of one input power source to another, with events generated by a cooperative load, and with sleep mode management. It is contemplated that the real time signal sent via 262 may comprise configuration data, in addition to the configuration data stored in non-volatile memory 261. The configuration data generated by the second signal node is sent via 263 to non-volatile memory 261 in control interface 260. The power sources are automatically configurable to different conditions according to configuration data stored in non-volatile memory 261; the different conditions comprise output voltage, topology, etc . . . Memory 261 can be non-volatile or volatile, and can be configured using metal options, fuses or anti-fuses.

The configurable power sources are generated by the design tool according to data structures of configurable power sources. The configurable power sources represented by the data structures are configurable with different conditions. The data structures represent automatic configuration of a power source according to a digital control signal representation.

A physical description of the power supply circuit is in the form of a physical design file that comprises physical design definitions of, for example, a first and second configurable power source that generate a first and second voltage, respectively. The physical design file is often referred to as a layout file, and it is contemplated that it may alternatively be in the form of a netlist instead of a physical layout. The physical design file, for instance, may be a physical layout to define a photomask process, or it may be a logic map for configuring a programmable device such as an FPGA (Field Programmable Gate Array). A power source in the physical design file can be configurable automatically according to a digital control signal representation.

Finally, a basic communication device architecture comprises a communication unit and a power supply unit comprising multiple configurable power sources for generating outputs at different conditions. The communication device thus comprises configurable power sources that can be configured at different conditions, for instance, different voltage levels and topologies. For example, the communication device can be a cell phone, laptop, or PDA that incorporates multiple power sources and multiple voltages into its functionality. Optimal topologies for different voltages can be configured automatically according to a digital control signal input to a control interface. The power supply unit can implement any of the different embodiments described above.

What is claimed is:
1. A computer-implemented method of designing a multi-output power supply, comprising the steps of:
inputting parameters of the multi-output power supply to a computer-aided design tool;
generating a design using said input parameters, wherein the step of generating a design comprises:

searching a library of power stage topologies;
extracting one or more topologies applicable to said design from said library;
selecting one or more preferred topologies from said one or more extracted topologies in accordance with said input parameters; and
incorporating said one or more preferred topologies into said design; and
outputting information describing said design.

2. The method of claim 1 wherein said design further comprises one or more multi-output power supply controllers.

3. The method of claim 2 wherein at least one of said multi-output power supply controllers is an ASIC.

4. The method of claim 3 wherein said ASIC further comprises a configurable controller.

5. The method of claim 3 wherein said ASIC further comprises at least one flexible controller.

6. The method of claim 2 wherein at least one of said multi-output power supply controllers is a configurable controller.

7. The method of claim 6 wherein said configurable controller further comprises at least one flexible controller.

8. The method of claim 1 wherein said multi-output power supply is a multi-input power supply.

9. The method of claim 1 wherein the multi-output power supply is a distributed multi-output power supply.

10. The method of claim 9 wherein said design further comprises one or more inter-communicating power supply controllers.

11. The method of claim 10 wherein at least one of said inter-communicating power supply controllers is an ASIC.

12. The method of claim 11 wherein said ASIC further comprises a configurable controller.

13. The method of claim 11 wherein said ASIC further comprises at least one flexible controller.

14. The method of claim 10 wherein at least one of said inter-communicating power supply controllers is a configurable controller.

15. The method of claim 14 wherein said configurable controller further comprises at least one flexible controller.

16. The method of claim 9 wherein said distributed multi-output power supply is a multi-input power supply.

17. The method of claim 1 further including the step of configuring a configurable multi-output power supply controller for controlling said multi-output power supply, wherein the step of configuring comprises transferring configuration information to said controller for storage in a memory accessible to said controller.

18. The method of claim 17 wherein transferring said configuration information to said controller is performed at least in part by a programmable processor.

19. The method of claim 17 wherein said memory is non-volatile.

20. The method of claim 1 further including the step of configuring a configurable multi-output power supply controller for controlling said multi-output power supply, wherein the step of configuring comprises storing configuration information in a memory accessible to said controller.

21. The method of claim 20 wherein said configuration information comprises topology information.

22. The method of claim 20 wherein said configuration information comprises startup or shut down information.

23. The method of claim 20 wherein said configuration information comprises sequencing information.

24. The method of claim 20 wherein said configuration information comprises sequencing information used by said controller during startup of said multi-output power supply.

25. The method of claim 20 wherein said configuration information comprises protection information.

26. The method of claim 20 wherein said configuration information comprises regulation information.

27. The method of claim 20 wherein said configuration information comprises link control information.

28. The method of claim 20 wherein said configuration information comprises input power selection information.

29. The method of claim 20 wherein said configuration information comprises current sharing information.

30. The method of claim 1 wherein said multi-output power supply incorporates a plurality of power stages, wherein designing said multi-output power supply includes designing a multi-output controller for said multi-output power supply, and wherein the step of inputting said parameters of said multi-output power supply to said computer-aided design tool includes inputting parameters of said power stages to said computer-aided design tool.

31. The method of claim 30 wherein said design is realized in an ASIC.

32. The method of claim 31 wherein said design realized in said ASIC further comprises a configurable controller.

33. The method of claim 31 wherein said design realized in said ASIC further comprises at least one flexible controller.

34. The method of claim 30 wherein said design comprises a configurable controller.

35. The method of claim 30 wherein said design further comprises a flexible controller.

36. The method of claim 30 wherein said plurality of power stages are power stages within a multi-input power supply.

37. A computer-implemented method of designing a multi-output power supply, comprising the steps of:
inputting parameters of the multi-output power supply to a computer-aided design tool;
generating a design using said input parameters, wherein the step of generating a design comprises:
searching a library of power stage control strategies;
extracting one or more control strategies applicable to said design from said library;
selecting one or more preferred control strategies from said one or more extracted control strategies in accordance with said input parameters; and
incorporating said one or more preferred control strategies into said design; and
outputting information describing said design.

38. A computer-implemented method of designing a multi-output power supply, comprising the steps of:
inputting parameters of the multi-output power supply to a computer-aided design tool;
generating a design using said input parameters, wherein the step of generating a design comprises:
searching a library of flexible controller templates;
extracting one or more templates applicable to said design from said library;
selecting one or more preferred templates from said one or more extracted templates in accordance with said input parameters; and
incorporating said one or more preferred templates into said design; and
outputting information describing said design.

39. A computer-implemented method of designing a multi-output power supply, comprising the steps of:

inputting parameters of the multi-output power supply to a computer-aided design tool;

generating a design using said input parameters, wherein the step of generating a design comprises:

searching a library of off-the-shelf power supply controllers, said library including configurable controllers;

extracting one or more controllers applicable to said design from the library;

selecting one or more preferred controllers from said one or more extracted controllers in accordance with said input parameters; and incorporating said preferred one or more controllers into said design; and outputting information describing said design.

40. The method of claim 39, wherein at least one of said off-the-shelf power supply controllers comprises at least one flexible controller.

41. The method of claim 39, wherein at least one of said off-the-shelf power supply controllers comprises an inter-communicating controller.

* * * * *